P. J. DESSELLE.
SOCKET FOR MINERS' DRILLS.
APPLICATION FILED NOV. 9, 1920.

1,412,676.   Patented Apr. 11, 1922.

P. J. Desselle
INVENTOR

BY Victor J. Evans
ATTORNEY

WITNESS: S. Mares

UNITED STATES PATENT OFFICE.

PETER J. DESSELLE, OF WEIR, KANSAS, ASSIGNOR OF ONE-HALF TO FRANK CLEGG, OF WEIR, KANSAS.

SOCKET FOR MINERS' DRILLS.

1,412,676.

Specification of Letters Patent. Patented Apr. 11, 1922.

Application filed November 9, 1920. Serial No. 422,899.

*To all whom it may concern:*

Be it known that I, PETER J. DESSELLE, a subject of the King of Belgium, residing at Weir, in the county of Cherokee and State of Kansas, have invented new and useful Improvements in Sockets for Miners' Drills, of which the following is a specification.

This invention relates to sockets for miners' drills, and the object is to provide a socket and drill shank which shall permit of the prompt and effective repair or tightening of the elements by the miner or workman, without the necessity of having repairs made by an expert "smith."

A further object is to provide a drill socket which shall include a forked element having a cut-away portion or socket per se at its inner end between the prongs of the fork, these prongs being apertured transversely, and the shank of the drill having a rolled end for reception within the socket, with particular means for securing the elements when assembled, without the necessity of cutting off the usual rivet and redrilling and reclamping the device.

A still further object is to provide, in connection with a drill of the type indicated, a socket, the inner cut-away portion of which shall have flared ends, the rolled end portion of the drill received within the socket extending laterally beyond the walls of the socket, so that the projecting portions may be hammered down, or swaged, the forked portion being secured by a rivet passing transversely through the prongs and through the apertured end of the shank of the drill.

The construction specified permits of the repair of the tool or drill and socket, when loosened during use, by the simple operation of hammering down the rivet, and if necessary hammering down the projecting end portions of the roll at the end of the drill shank. This operation may be performed by any workman, whereas a skilled "smith" is required for repairing the usual type of drill used by miners.

With the foregoing and other objects in view, the invention consists in the novel construction, combination and arrangement of parts hereinafter described and claimed:

Figure 1:
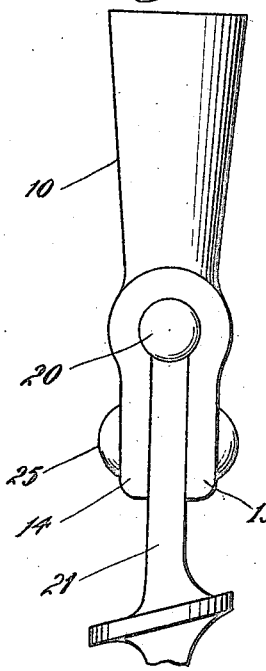
Figure 1 is a view of the socket, in side elevation, the drill being shown in position and a portion of the latter being broken away.
Figure 2:
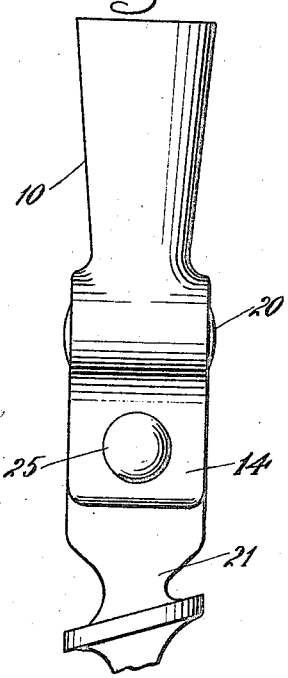
Figure 2 is a similar view, from another angle.
Figure 3:
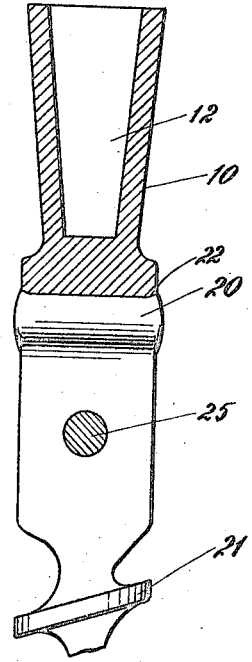
Figure 3 is a view in elevation and longitudinal section, the shank of the drill being shown.

In carrying out my invention I provide a socket member 10 including a recessed portion or socket per se designated 12, and including a forked portion at the opposite end. The prongs of the fork are shown at 14 and 15, and these elements are apertured transversely as shown at 16.

Between the prongs of the fork is a cut-away portion, or enlarged opening of the form shown and designated 18. This cut-away portion receives the rolled end 20 of the drill 21 so that the cut-away portion referred to is in the nature of a bore, the ends thereof being flared as shown at 22, and the rolled end 20 has its end portions projecting beyond these walls of the socket member, so that these ends may be hammered down or swaged for effecting a positive connection, and preventing relative movement between the socket and the drill. The shank of the drill may be rectangular in cross section as shown, and the aperture in the shank accommodates the rivet 25 passing through the prong of the fork and having its ends headed. The roll 20 extends in a direction perpendicular to the direction in which the rivet passes through the fork, so that an especially effective locking device is produced, and in making repairs, it is only necessary to hammer down the headed portion of the roll and head of the rivet, in the manner indicated.

Figure 6:
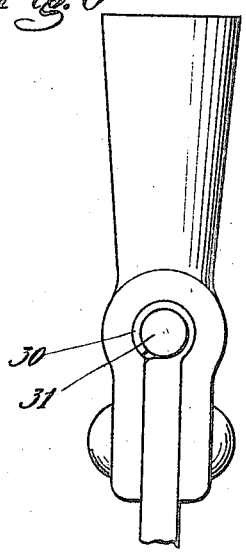
Figure 6 is a view in elevation of a modified form.
Figure 4:
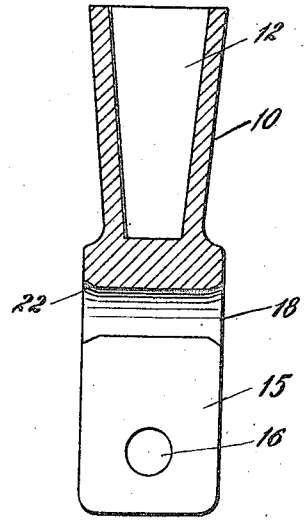
Figure 4 is a similar view, the shank of the drill being omitted.
Figure 5:
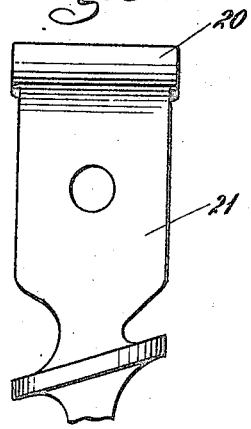
Figure 5 shows the shank of the drill, detached.

The roll portion of the drill per se is shown in detail in Figure 5, and in Figure 6, I have shown a slight modification in which the rolled portion is hollow, this portion being designated 30 and providing for the accommodation of a transverse pin 31, adapted to be forced into position, thereby wedging the rolled end. It is obvious that other minor changes may be resorted to, within the scope of the appended claims.

What is claimed is:

1. In a device of the class described, a socket member provided with a forked end and with a cut-away portion between the prongs of the fork, and a drill having a shank provided with a rolled end, the edge portion of the cut-away portion being enlarged with reference to the central portion thereof, a securing device passing transversely through the prongs and the shank, and the ends of the rolled portion being swaged.

2. In a device of the class described, a socket member provided with a forked end providing flattened prongs, a cut-away portion of circular cross section being provided between the prongs and being enlarged near the outer portion thereof, a drill having a flattened shank and a rolled end for cooperation with the flattened prongs and the cut-away portion between the prongs, and a securing device passing transversely through the shank and prongs and having its end headed, the rolled portion projecting beyond the cut-away portion of the fork, and said projecting end being swaged.

3. A device of the class described, comprising a socket member having a forked end cut out to form an enlarged opening between the inner portions of the prongs of the fork, and a drill having a shank portion terminating in a roll-shaped end positioned in the opening, portions of said end being spread laterally to prevent transverse movement of the drill in either direction.

In testimony whereof I affix my signature.

PETER J. DESSELLE.